J. M. EADIE.
TRAILER.
APPLICATION FILED MAY 19, 1919.
1,432,980.
Patented Oct. 24, 1922.
3 SHEETS—SHEET 3.
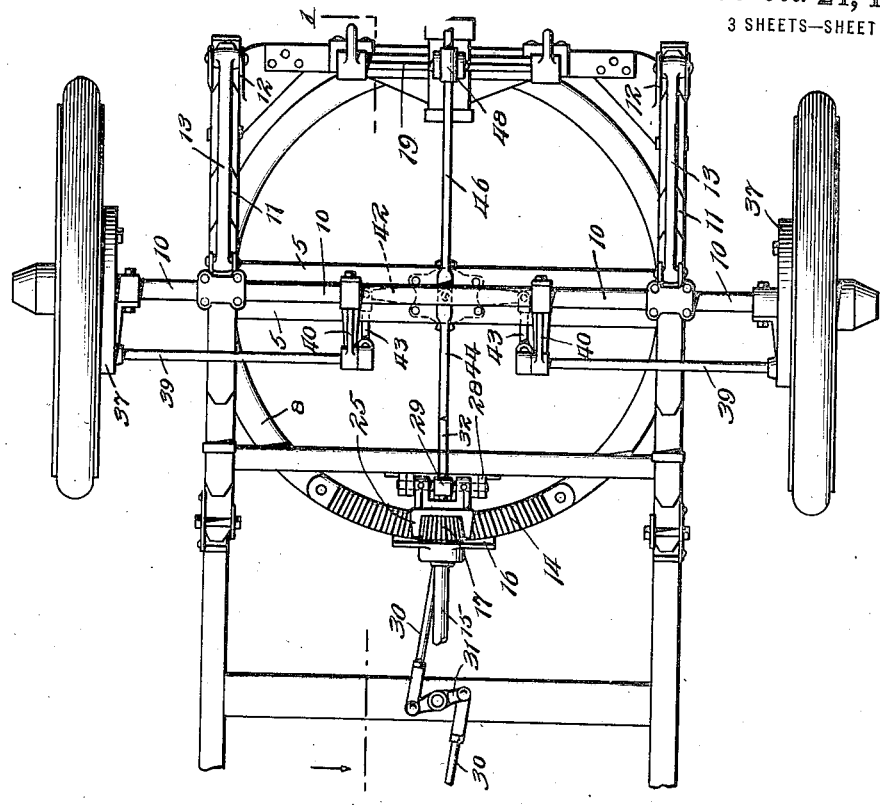
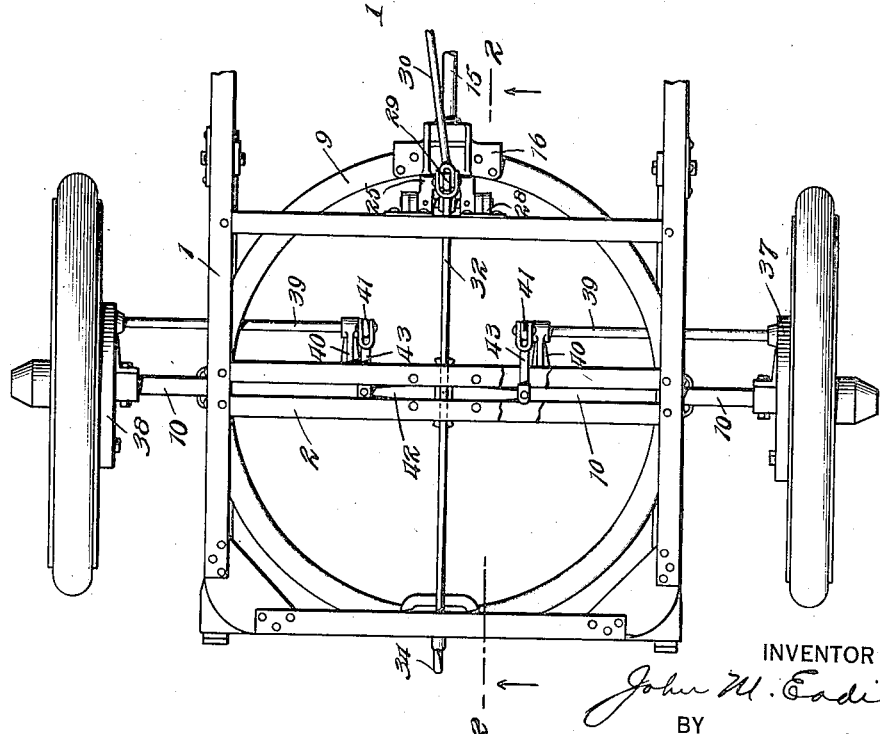
INVENTOR
John M. Eadie
BY
Kenyon & Kenyon
his ATTORNEYS Patented Oct. 24, 1922.

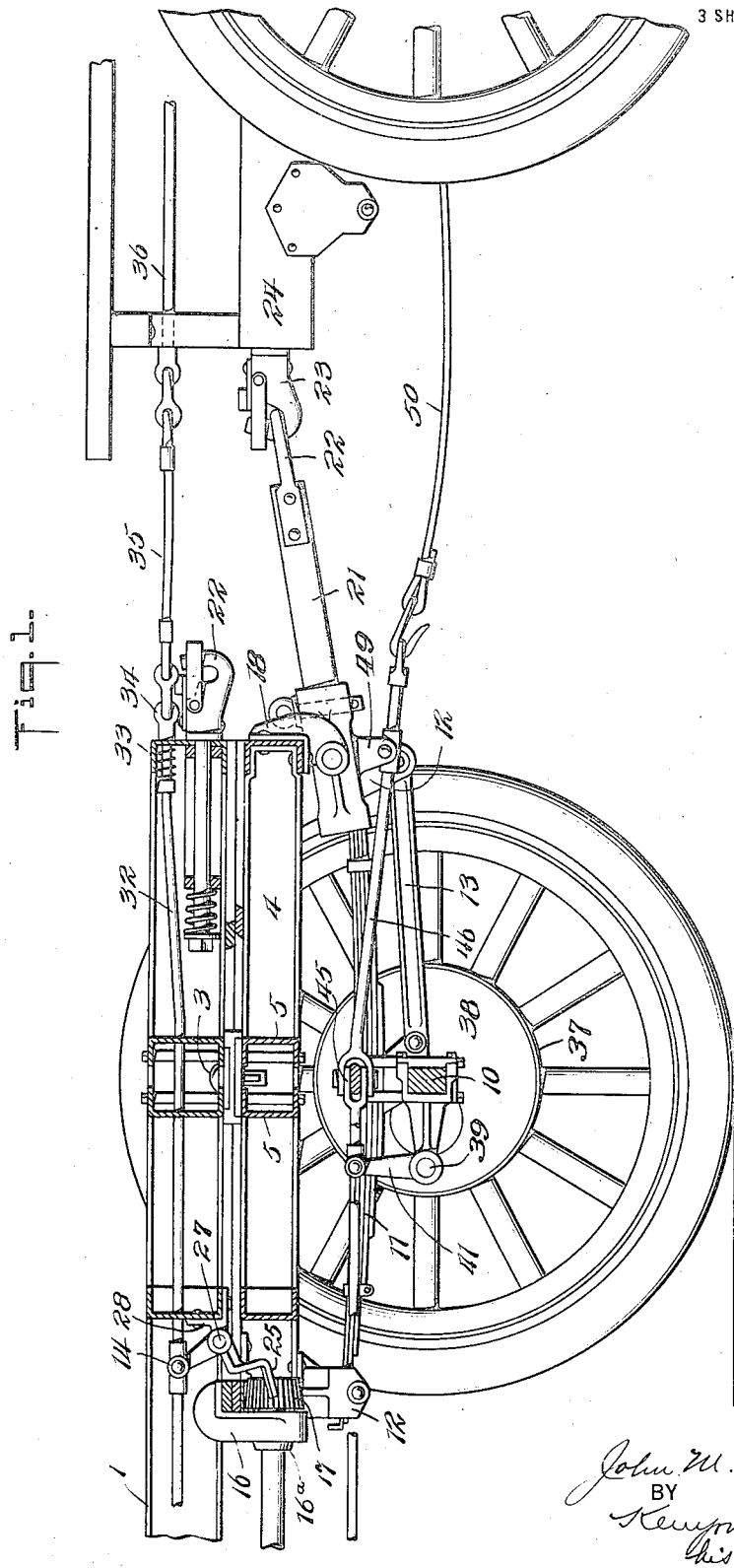

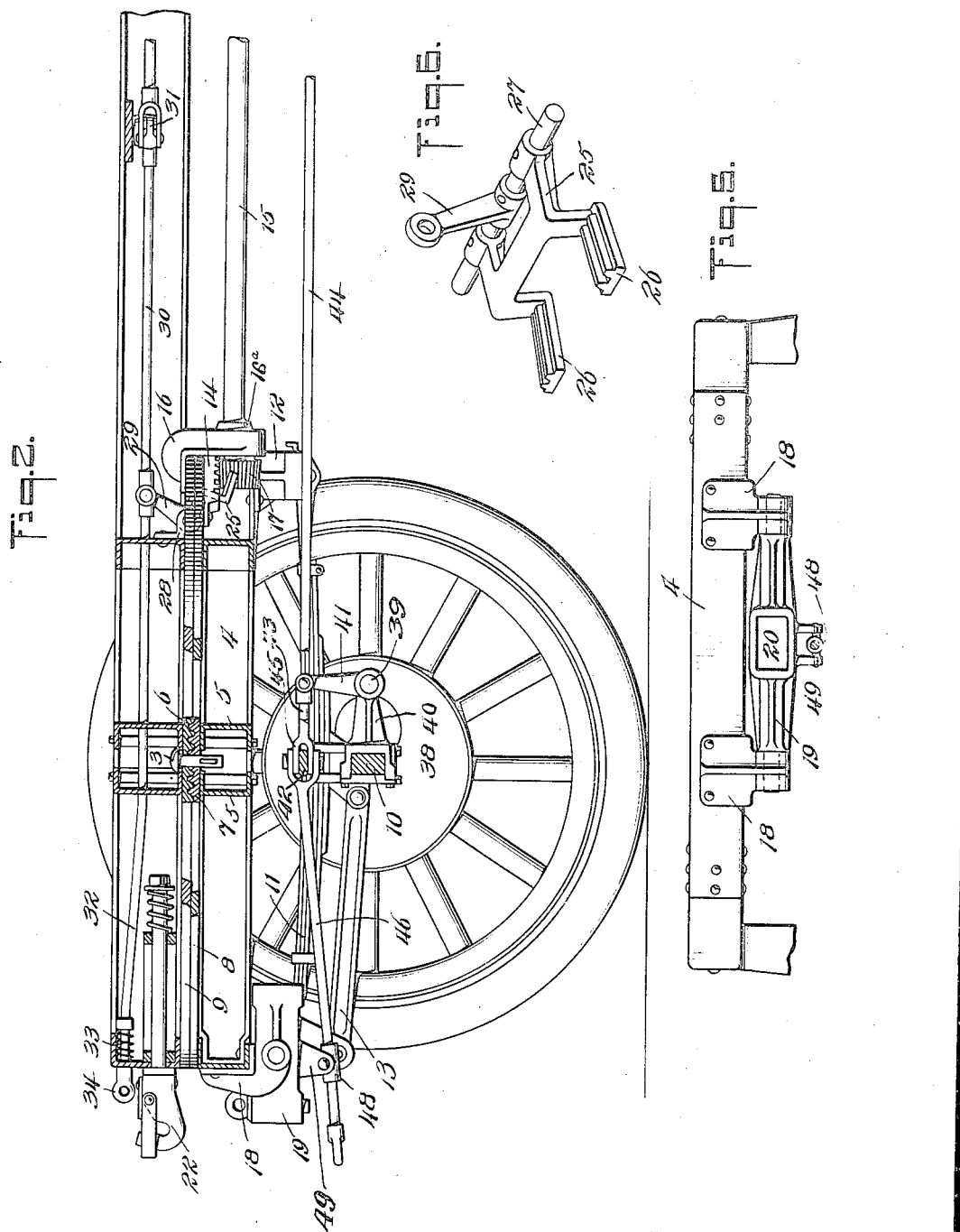

1,432,980

UNITED STATES PATENT OFFICE.

JOHN M. EADIE, OF NEW YORK, N. Y.

TRAILER.

Application filed May 19, 1919. Serial No. 298,145.

*To all whom it may concern:*

Be it known that I, JOHN M. EADIE, a citizen of the Dominion of Canada, residing in New York city, N. Y., have invented new and useful Improvements in Trailers, of which the following is a specification.

My invention relates to vehicles and particularly to that class of vehicles adapted to be attached to another vehicle for movement with it.

It is an object of my invention to provide a vehicle having wheels mounted upon it for steering and to arrange the parts thereof so that springs transmit weight directly to the axles and all the steering mechanism is supported above the springs.

Another object of my invention is to provide means for maintaining the proper relation between an axle of a vehicle of the class described and the vehicle body or main frame regardless of type or condition of springs to insure proper steering and braking conditions.

Another object of my invention is to provide steering mechanism for a vehicle of the type described, together with means for controlling the steering mechanism.

Another object of my invention is to provide braking mechanism for a vehicle of the class described, and a further object is to arrange such mechanism to operate simultaneously upon four wheels all mounted for steering.

Another object of my invention is to provide an operative arrangement of the parts of a vehicle of the class described whereby the vehicle may be attached by either end to another vehicle in such a manner as to render operative from such other vehicle the steering, steering control, and braking mechanism.

Other and further objects and advantages of my invention will appear from the following description taken in connection with the accompanying drawings forming a part of this specification and in which Figure 1 is a sectional view, with parts broken away, of a trailer embodying features of my invention.

Figure 2 is a sectional view, with parts broken away, of a trailer embodying features of my invention.

Figure 3 is a plan view, with parts broken away, looking downward on the top of the trailer.

Figure 4 is a plan view, with parts broken away, looking upward from the underside of the trailer.

Figure 5 is a front view, with parts broken away, of an auxiliary member of the trailer.

Figure 6 is a detailed view of a lock for the steering mechanism of the trailer.

For the purpose of disclosing my invention, Figures 1 and 2, taken together, illustrate the longitudinal section, with parts broken away, of a trailer embodying typical forms of certain features of my invention.

The trailer may have any type of body, but in the construction herein illustrated, the main frame or body, member 1, is constructed of channel iron and is rectangular in form. Cross members 2 are included in the main frame and have pivoted to them, by means of king bolts 3, auxiliary members or platforms 4. The auxiliary members 4 in the embodiment herein illustrated are built up of channel iron and include transverse members 5. Bearing plates 6 and 7, having counterpart circular ridges, respectively, are secured to the cross members 2 and 5 and the king bolt 3 passes through them, the counterpart ridges taking the side thrust and preventing the king bolt from shearing. Secured to the upper face of the auxiliary member 4 is a circular bearing member 8 which bears upon a similar circular bearing member 9 secured to the lower side of the main frame 1. The axles 10, having wheels upon opposite ends, carry springs 11 which have sliding engagement in the spring brackets 12, which are secured to the auxiliary member 4. In order to maintain the wheeled axles in proper relation to the pivots 3 of the auxiliary members, radius rods 13 are secured to the axles and to the outward spring bearing member 12.

In order to cause the auxiliary members with their wheeled axles to turn or rotate equally and oppositely on their pivots, the bearing ring 8 of each auxiliary member is provided on its lower face with a circular rack 14. A shaft 15, supported by brackets 16, attached to the upper bearing rings 9 has beveled gears 17 engaging the racks 14.

On the outer ends of the auxiliary members 4, brackets 18 have coupler-receiving members 19 mounted in them for rotation in a vertical plane, which have an opening 20, for the reception of the rigid coupling 21, which has a loop 22, engaging a draw bar 23 of the tractor vehicle 24. If the trailers are connected up in a train the coupler 21 of one trailer may engage the draw bar 22 of the preceding trailer, there being both a draw bar and a coupler-receiving member at each end of the trailer.

It will be apparent that any turning of the tractor or a preceding trailer will impart a rotation to forward auxiliary member 4 by means of the coupler 21 and a reverse rotation will be imparted to the rear auxiliary member 4 through the automatic steering mechanism comprising the racks and gears, thus effecting the short turn of the trailer and a tracking of the trailer. However, when it is desired to back the trailer by means of pressure imparted through the coupling member 21, an undesirable turning of the automatic steering mechanism will occur. Therefore, I have provided a locking means for the automatic steering mechanism of the short turn trailer described, which means comprises a locking member 25, which has two arms 26 adapted to engage the teeth of the racks 14 and which is pinned to the shaft 27 mounted in brackets 28, secured to the main frame or body. There is also pinned to each shaft 27 a lever arm 29, which extends upwardly. Each arm, 29, has attached to it an operating rod, 30, and the two operating rods are connected to a reversing lever 31 pivoted to the main frame. This is called the reversing lever because when one rod 30 is pulled it effects a pushing upon the other rod 30. There is also attached to each lever 29 an operating rod 32 extending outwardly toward the end of the trailer and provided with a spring 33, normally holding the rod 32 pressed inwardly toward the center of the trailer. The outer end of each rod 32 has an eye 34 whereby it may be secured by means of a tension link 35 to a lock operating rod 36 on the tractor device.

It will be apparent from the foregoing description that the coupler 21 is rigid and will withstand any pressure due to tension upon the lock operating mechanism in case the trailer is tending to overrun the tractor or preceding trailer. It will be further apparent that tension upon either eye 34 and its appropriate rod 32 will cause the locking members 25 to swing up into engagement with the racks 14 and hold the auxiliary members against rotation so that the trailer or train of trailers may be backed along any line or curve upon which they may be located.

Each wheel is provided with a brake drum 37, and a plate on each axle carries internally expanding brake mechanism within the drum 37 not shown, for co-operation with the brake drum as more fully shown in my copending application, Serial No. 298,146 filed May 19, 1919, for trailers and which is operated by means of a brake shaft 39. The inner end of each brake shaft 39 is mounted in bracket 40, mounted on the axle 10 and carries an upwardly extending arm 41. An equalizing member 42 positioned in the pivotal axis on each auxiliary member 4 has its opposite ends attached to the two upwardly extending arms 41 by means of links 43. A brake operating rod 44 is connected to each equalizing member at the pivotal axis of each auxiliary member by means of a yoke 45. Brake operating rods 46 are also attached to the equalizing members at the same respective points and extend outwardly to the ends of the trailer through sleeves 48, pivotally mounted in ears 49 extending downwardly from the coupler-receiving members 19. A flexible tension, member 50, extends from the brake operating rod 46 of each trailer to the preceding trailer or tractor and the rigidity of the couplers 21 permits tension in the members 50 to apply the brakes of the trailers.

It will be apparent from the above description that while I have provided mechanism giving automatic short turning to a trailer in which the axles are pivoted to the main body, I have provided brake mechanism, acting simultaneously on all four wheels, which will operate at various positions of the axles by reason of the fact that the equalizing members on each axle are joined to the brake operating mechanism in the pivotal axis on each auxiliary member 4. The radius rods 13 insure that the axles will remain in proper relation to the pivotal axes of the auxiliary members so that there will be no undesirable stress set up by cramping action during the automatic steering and so that the brakes will not possibly be applied when steering occurs.

It will be seen that each end of the trailer is similarly constructed and that the locking and braking mechanism are both operated by tension and the coupler is a rigid member susceptible of taking compression stress and capable of effecting the steering. As a result my trailer is reversible, end for end, and can be braked or steered or locked.

One of the features of my invention resides in a constructional detail. The brackets 16, which position the shaft 15 relatively to the body member, carry bearings 16ª which surround the shaft adjacent to and between the gears 17 so that they respectively support the shaft against radial thrust and support the gears against axial thrust.

While I have described the features of my invention in considerable detail for the purpose of disclosing the principles and advantages of the same, I do not intend that I shall be limited to the structural details used for purposes of disclosure, but I intend that my invention shall be defined by the hereunto appended claims.

What I claim as new and desire to secure by Letters Patent is:

1. A trailer having front and rear wheeled axles, brake mechanism operable upon wheels of the trailer, auxiliary members carried by the axles and turning therewith, a body pivotally supported upon said members, a shaft carried by the body and geared to both auxiliary members to cause like turning movements of both axles, a draw bar connected to turn with an axle, a brake operating rod carried by a support turning with an axle, said draw bar and brake operating rod extending from an end of the trailer and adapted to be connected to the body of a tractor, whereby both wheels of the trailer may be made to accurately follow the path of the rear of the body of a tractor and the brakes may be operated from such tractor at any position of said wheels.

2. A trailer having front and rear wheeled axles, an auxiliary member carried by each axle, a body pivotally supported on said members, connections between the auxiliary members compelling them to turn together, said connections including a part carried by the body, a locking member carried by the body operable at any position of the wheels to lock them at that position, a draw bar connected to turn with an axle, and an operating rod for said locking member supported by the body of the trailer, said draw bar and lock operating rod extending from an end of the trailer and adapted to be connected to the body of a tractor whereby all wheels of the trailer may be made to follow the path taken by the rear of the body of the tractor and may be locked in any position to be backed along any curve desired by the tractor operator.

3. A trailer having front and rear wheeled axles, auxiliary members turning therewith, a body pivotally supported upon said members, a connection between the auxiliary members compelling them to turn together, brake mechanism operating simultaneously on all wheels of the trailer, operating rods for said brake mechanism extending to each end of the trailer and supported from the respective auxiliary members, suitable draw bar connections each connected to turn with one of the auxiliary members whereby, by connecting a draw bar connection and a brake operating rod to the body of a tractor vehicle, the trailer may be drawn from either end and all wheels will follow the path taken by the rear of the tractor body and the brakes on all wheels of the trailer may be operated from said tractor at any position of said wheels.

4. A trailer having front and rear wheeled axles, an auxiliary member carried by each axle, a body pivotally supported on said members, a connection between the auxiliary members compelling them to turn together, comprising a part carried by the body engaging said auxiliary members, a locking member carried by the body operable at any position of the wheels to lock them at that position, draw bars each connected to turn with one of said auxiliary members, operating means for said locking member carried by the body of the trailer and extending to each end thereof, whereby either end of the trailer may be drawn by a tractor while all wheels of the trailer are made to turn together to follow the path taken by the rear of the body of the tractor and may be locked in any position to be backed in a straight line or along any curve desired by the tractor operator.

5. A trailer having front and rear wheeled axles, an auxiliary member carried by each axle, a body pivotally supported on said members, connections between the auxiliary members compelling them to turn together, locking means carried by the body operable at any position of the wheels to lock them at that position, brake mechanism operable upon wheels of the trailer, a draw bar connected to turn with an auxiliary member, a brake operating rod supported from an auxiliary member and extending to an end of the trailer, a rod connected with the locking device supported by the body and extending to the same end of the trailer whereby all wheels of the trailer may be made to turn together to follow the path taken by the rear of the body of the tractor, and at the will of the tractor operator the brakes may be applied at any position of the wheels, and the wheels may be locked in turning at any position to permit the trailer to be backed in a straight line or along any desired curve.

6. A trailer having front and rear wheeled axles, an auxiliary member carried by each axle, a body pivotally supported on said members, connections between the auxiliary members compelling them to turn together, a lock member carried by the body operable at any position of the auxiliary members to lock them at that position, a brake mechanism operable upon wheels of the tractor, draw bars at opposite ends of the trailer connected to turn with the auxiliary members, brake operating rods extending from opposite ends of the tractor and supported from the auxiliary members, operating rods for the locking mechanism carried by the body and extending to both ends of the trailer, whereby the trailer may be connected at either end to the body of a tractor and the wheels of the trailer may be made to turn together to follow the path taken by the rear of the body of the tractor, may be locked in any position to be backed along any path desired by the tractor operator, while the brakes may be applied at any position of the trailer wheels, whether locked or unlocked.

7. In a short turn trailer having automatic steering mechanism, means for locking said mechanism comprising a reversing lever, and operating rods extending from said lever to opposite ends of said trailer and means holding said rods in inoperative position.

8. In a short turn trailer having automatic steering mechanism, means for locking said mechanism including a reversing lever and parts extending from said lever to opposite ends of the trailer.

9. In a trailer, a main member, wheeled axles pivoted thereto, means for transmitting pivotal motion from one axle to the other, means cooperating with said last named means for locking said axles in a plurality of positions against pivotal motion, and a rod connecting with said locking means to operate the same by its longitudinal movement, said rod extending beyond an end of the trailer and adapted to be connected with mechanism on a tractor.

In testimony whereof, I have signed my name to this specification.

JOHN M. EADIE.